UNITED STATES PATENT OFFICE.

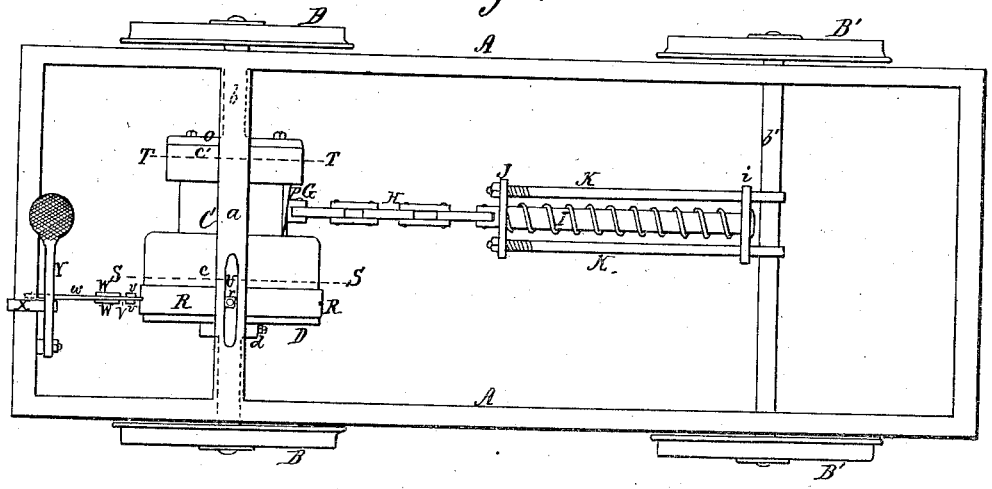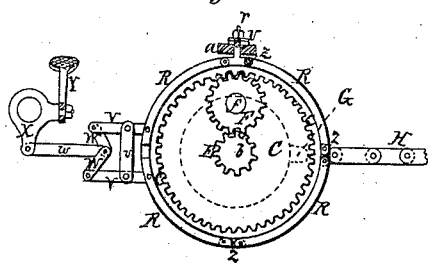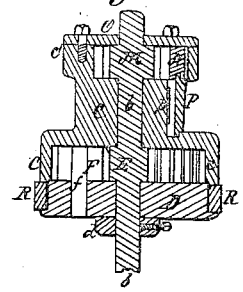

WM. R. KAY AND HENRY E. KAY, OF WESTERLY, RHODE ISLAND, ASSIGNORS TO THEM-SELVES, AND BENJAMIN D. KAY, OF FALL RIVER, MASSACHUSETTS.

CAR-BRAKE.

Specification of Letters Patent No. 32,665, dated June 25, 1861.

*To all whom it may concern:*

Be it known that we, WILLIAM R. KAY and HENRY E. KAY, of Westerly, in the county of Washington and State of Rhode Island, have invented certain new and useful improvements in propulsive car-brakes, or in those by which the momentum or force exerted by a car in being brought to a state of rest is stored up in a spring to be given out again in starting, and that the following is a full and exact description thereof.

Several attempts have heretofore been made to utilize the power expended in stopping cars and other vehicles, but so far as we are aware, all such devices have required a distinct and separate action on the part of the driver or brakeman for throwing the apparatus into gear so as to propel the car, from that required to break up, or to throw it into gear to wind up the spring, or have required in other respects a considerable amount of skill and practice in the use of the invention.

In our invention the several parts are self-acting, and the very act of releasing the brake causes the spring to act upon and propel the car, so that the invention may be successfully used without previous practice.

The nature of our invention consists first in the combination of two drums or wheels both mounted loosely on the axle of the car, and so connected to each other and to the axle by suitable gearing that when the brake is applied to one to stop its motion, the motion of the axle is transmitted to the other through the gearing causing it to turn in a direction opposite to that of the axle, and thereby wind up a spring; but when the brake is removed from the first wheel or drum, the spring tends to and is at liberty to rotate the second drum in the same direction of the motion of the axle. This action takes place when the car is moving in either direction, and requires only the same care and skill now employed.

The nature of our invention also consists in the employment of certain devices whereby the pawls are rendered self-acting, or the action of the spring is caused to bring the proper pawl into use at the proper time.

The nature of our invention also consists in the combination of a number of jointed segments forming a flexible strap, with a spring for supporting it and certain levers and tie for drawing the ends together, the whole serving as an efficient and durable brake having advantages which will be set forth below.

The nature of our invention also consists in the combination of certain parts for operating the brake in a powerful manner without causing much side strain on the axle.

To enable others skilled in the art to make and use our invention we will proceed to describe its construction and operation, reference being had to the accompanying drawings, in which—

Figure 1 is a plan view of the truck of a street car, with our improved brake attached. Fig. 2 is a section through the line S, S, in Fig. 1, with the brake wheel entirely removed. Fig. 3 is a longitudinal section through the axle, and Fig. 4 is a cross section on a larger scale through the line T, T, in Fig. 1.

Similar letters of reference indicate like parts in all the drawings.

A is the truck or frame of the car, and B, B, B', B', the wheels mounted on axles $b$, $b'$. On the axle $b$, we loosely mount a drum C having a projecting rim $c$, carrying teeth on its internal surface as represented. By the side of C we also mount loosely another drum or wheel D (see Fig. 3,) which is kept in contact with $c$ by means of a collar $d$, as represented. On the axle $b$ in the space between C and D which is formed by the projecting rim $c$, we fix a pinion E firmly keyed so as to turn $b$. We mount a gear F loosely on a pin $f$, fixed in D, which gear wheel is so proportioned to E and C as to mesh into the teeth on both, as plainly shown in Fig. 2. The effect of this arrangement is such that if while the car is in motion the drum C be held stationary by the tension of a chain to be hereafter described, the gear F will be caused to travel around E in the same direction in which $b$ revolves, and as F is fixed to the wheel D the latter will therefore revolve with it. If however the wheel D and consequently the axis of F be held stationary the drum C will be caused to revolve in the opposite direction from that of $b$, the rapidity of the movement depending on the proportion of the gears E, F and $c$. It will be seen that the wheels E and F are inclosed in a box or case formed by the drum C with its projecting rim $c$, and the wheel D, and that they are thereby protected from the mud and dust which is always to be found under a car. They will therefore require but little oiling and attention to keep them in good running order.

In the side of the drum C we fix a stud or staple G, to which a chain H is attached. The other end of this chain is attached to a rod I, which passes freely through a cross bar J, fixed to two rods K, K, which rods are in turn fixed to any convenient portion of the truck. The rod I carries a cross bar $i$ at its other end which fits loosely upon the rods K, K, so as to slide thereon. A powerful coiled spring L is placed on I between J and $i$, and tends to keep them apart thereby causing a tensile strain on the chain H. It will be observed that when the drum C is turned in either direction from the position represented, the chain H will be wound thereon and the spring L compressed which will tend to return C to its former position. On the other end of C from $c$, is another projecting rim C', (Fig. 4) within which is a ratchet or gear wheel M which like E before described, is firmly fixed to the axle $b$. A pin or bolt $n$ fixed in C, carries two pawls N, N', adapted to take in M and which are free to act independently each of the other. A plate O fitted loosely on the axle $b$ and bolted to $c'$ incloses the ratchet wheel M and pawls N, N', so as to protect them from dust. In longitudinal grooves in the surface of the drum C we place the levers P, P', which project beyond the surface of C, and are held in such position by springs $p$, (Fig. 3.) One of these levers P and P', is placed each side of the stud or eye G to which the chain H is attached, and the pin $n$ is correspondingly located as shown in Fig. 4. An end of each of these levers enters a corresponding hole in the pawls N, N', and thus by the force of the spring $p$, holds them from contact with the ratchet M.

It will be seen that if either of the levers P or P' be pressed inward so as to compress its supporting spring $p$, the corresponding pawl will be caused to engage the ratchet M, and thus will connect the drum C with the axle $b$, so that when the former is turned in one direction the other must move with it, but when the drum C moves in the other direction the pawl will slip over the teeth in M without affecting the axle. Therefore when the chain is wound in one direction on C, P is depressed and N brought into action, and when it is wound in the opposite direction, P' is depressed and N' brought into action. It will be observed that the chain is at liberty to be wound on C in either direction without affecting the axle $b$, but it cannot be unwound in either direction without causing the axle $b$ to be turned with the drum.

Around the exterior of the brake wheel D we place a brake composed of several segments R, R, hinged together by stout knuckles Z as shown in Fig. 2. On the upper side a bolt $r$ is attached, and passing through a cross bar $a$ on the truck A, is supported by a spring U, which tends to hold the brake a little way from contact with the wheel D. To the two ends of the bent or nearly circular strap formed by the segments R, two levers V, V, are jointed and a tie $v$ connects these two levers in such a manner that when their outer ends are forcibly separated the strap R, R, is contracted around the wheel D causing a considerable friction thereon without causing any extra strain on the axle $b$. When the force is removed the spring U and the weight of the lower part of the strap remove it from contact with D and thus permit the latter to turn freely.

To apply the proper force to the levers V, V, we employ a toggle W, W. A rod $w$ connects this toggle with a bell-crank lever X attached to the truck, which bell-crank lever is operated by a treadle or foot lever Y. By placing the foot on Y the toggle W is straightened and the brake brought into action. The side strain on the axle is only equal to the strain on the rod $w$, while the strain on the strap R Z' is many times as great owing to the leverage of W and also of V. This leverage is so great that a slight strain on the lever Y is sufficient to hold the wheel D stationary within the brake-strap R, Z.

The operation of our invention is as follows: When it is desired to stop the car the brakeman places his foot on the treadle Y and thereby prevents the wheel D from rotating and thus holds the axis of the gear F stationary. The axle $b$ continuing to rotate causes by means of the gearing E, F, C, the drum C to rotate in a contrary direction winding the chain H thereon and compressing the spring L. The momentum of the car is thus transferred to the spring, instead of being used up in friction as in the ordinary brake. In winding upon the drum C the chain H, has pressed upon one of the levers P or P', according to the direction in which it is wound, and thereby brought the proper pawl into play to prevent the drum C from returning without carrying the axle $b$ with it, and as the wheel D and drum C are connected to each other and to the axle by the gear F, the drum and axle cannot turn in the same direction without also turning the wheel D to the same extent. It follows therefore that so long as the wheel D is prevented from turning by means of the brake R the spring L is kept in a compressed condition and the car remains stationary but so soon as the force is removed from Y and the wheel D released, the elasticity of the spring L unwinds the chain from C, in doing which it rotates the axle $b$ and starts the car in the same direction in which it was previously moving. This action takes place in whichever direction the car is moving, the chain H being wound in all cases in the direction opposite to the motion of the axle $b$.

Should the strength of the spring L, under any circumstances be insufficient to overcome the momentum of the car, the wheel D will, after taking up the spring in the manner above described slip within the brake strap R and act in the same manner as an ordinary brake.

Any other form of spring may be used in place of the spiral spring L if desired with equal effect, and an ordinary brake may be applied in the place of the brake R, $r$, V, V, $v$, W, but this form is believed to possess advantages over all others known to us. It is very powerful, and causes little strain on the axle, while it is not liable to gather dust and cause rapid abrasion of the parts.

The whole apparatus is simple, compact, not liable to get out of order, inclosed from the dust and requires no more skill or attention from the brakeman or driver than the ordinary brake.

Having thus fully described our invention what we claim as new therein and desire to secure by Letters Patent, is,

1. The brake-wheel D, drum C, and axle $b$ so combined and connected by means of suitable gearing substantially as herein described that when the brake is applied to the brake-wheel D the drum C is caused to turn in a direction opposite to that of the axle, and thereby to wind up the spring L, or its equivalent, substantially as and for the purpose herein set forth.

2. The ratchet levers P and P′, in combination with the pawls N and N′, and chain H, or its equivalent, so arranged that the winding of the chain on the drum C in either direction, brings into play the proper pawl substantially as above set forth.

3. The multijointed strap R, Z, in combination with the spring U, levers V and V′, and link $v$, the whole operating together substantially as and for the purpose herein specified.

4. The combination of the toggle W, W, the levers V and V′, the tie $v$ and the jointed or flexible strap R, substantially as and for the purpose herein set forth.

In testimony whereof we have hereunto set our hands in the presence of two subscribing witnesses.

WM. R. KAY.
HENRY E. KAY.

Witnesses:
WILLIAM P. COY,
W. H. ROBINSON.